(12) United States Patent
Zhang et al.

(10) Patent No.: US 10,349,020 B2
(45) Date of Patent: Jul. 9, 2019

(54) INFORMATION PROCESSING METHOD AND ELECTRONIC APPARATUS

(71) Applicant: Lenovo (Beijing) Co., Ltd., Beijing (CN)

(72) Inventors: Xiaodan Zhang, Beijing (CN); Zhurong Fu, Beijing (CN); Yanjiang Hu, Beijing (CN); Yuling Wei, Beijing (CN)

(73) Assignee: LENOVO (BEIJING) CO., LTD., Haidian District, Beijing (CN)

(*) Notice: Subject to any disclaimer, the term of this patent is extended or adjusted under 35 U.S.C. 154(b) by 778 days.

(21) Appl. No.: 14/641,045

(22) Filed: Mar. 6, 2015

(65) Prior Publication Data

US 2016/0070421 A1    Mar. 10, 2016

(30) Foreign Application Priority Data

Sep. 9, 2014    (CN) .......................... 2014 1 0456719

(51) Int. Cl.
  *G06F 3/14*    (2006.01)
  *H04N 9/31*    (2006.01)

(52) U.S. Cl.
  CPC ......... *H04N 9/3179* (2013.01); *G06F 3/1423* (2013.01); *G06F 3/14* (2013.01); *G09G 2340/045* (2013.01)

(58) Field of Classification Search
  CPC .................................. G06F 3/14; G06F 3/1423
  See application file for complete search history.

(56) References Cited

U.S. PATENT DOCUMENTS

2003/0142337 A1*    7/2003    Kizaki ................... G06K 15/18
                                                358/1.13
2004/0164977 A1    8/2004    Yoshida
(Continued)

FOREIGN PATENT DOCUMENTS

TW    201104561    2/2011

OTHER PUBLICATIONS

Kalinowski et al., "How to Hide a Laptop Display," Oct. 17, 2012, https://web.archive.org/web/20121017000912/https://smallbusiness.chron.com/hide-laptop-display-46531.html.*
(Continued)

*Primary Examiner* — Ryan Barrett
(74) *Attorney, Agent, or Firm* — Brinks Gilson & Lione; John C. Freeman

(57) ABSTRACT

An information processing method and an electronic apparatus are described. The information processing method includes determining, whether a content of an application in N applications is projected with the full-screen window by a projection unit of the electronic apparatus, and obtaining a determination result; setting a corresponding ID for an application, if the determination result indicates that the content of the application is projected; obtaining an operation, wherein the operation is used to switch a window of a k-th application among the N applications to a certain state, where 1≤k≤N; detecting whether the k-th application is provided with an ID, to obtain a first detection result; and setting a running state of the k-th application to a play state, if the first detection result indicates that the k-th application is provided with the ID, so that a content played by the k-th application is projected.

10 Claims, 7 Drawing Sheets

(56) References Cited

U.S. PATENT DOCUMENTS

| | | | |
|---|---|---|---|
| 2011/0019156 A1* | 1/2011 | Chang | H04N 9/3173 353/31 |
| 2015/0095758 A1* | 4/2015 | Rossi | G06F 17/3089 715/234 |
| 2015/0095838 A1* | 4/2015 | Rossi | G06F 3/0483 715/777 |
| 2015/0121194 A1* | 4/2015 | Patten | G06F 3/0483 715/234 |
| 2018/0004476 A1* | 1/2018 | Cunningham | G06F 3/0484 |

OTHER PUBLICATIONS

Smith, "Keep YouTube Audio Playing on a Multitasking iPhone," Oct. 14, 2010, https://lifehacker.com/keep-youtube-audio-playing-on-a-multitasking-iphone-5663832.*

First Office Action dated Dec. 1, 2016 (12 pages) out of Chinese priority Application No. 201410456719.6.

* cited by examiner

INFORMATION PROCESSING METHOD AND ELECTRONIC APPARATUS

This application claims priority to Chinese patent application No. CN 201410456719.6 filed on Sep. 9, 2014, the entire contents of which are incorporated herein by reference.

BACKGROUND

The present disclosure relates to an information processing technology, and more particularly, to an information processing method and an electronic apparatus.

Currently, an electronic apparatus, such as a mobile phone or a tablet personal computer can have a projector module built in by a micro-cast technology, providing power for the projector module by a power supply of the electronic apparatus itself. The micro-cast technology implements two working modes of full-screen projection and split-screen projection by a multi-window mechanism. The full-screen projection refers to that a projected content is exactly the same as a display content of the electronic apparatus; and the split-screen projection refers to that the projected content is a content in a certain application window of the electronic apparatus.

When the split-screen projection is used, if the application window corresponding to the projected content on the electronic apparatus is zoomed out, then the content played on the application window is paused, but a user often wants that when the application window on the electronic apparatus is zoomed out, the projected content can continue to be played; however, currently there is no effective means to solve this problem.

SUMMARY

To solve the above technical problem, embodiments of the present invention provide an information processing method and an electronic apparatus.

An embodiment of the present invention provides an information processing method, applied to an electronic apparatus capable of displaying N non-full-screen windows corresponding to N applications, where N≥1, wherein the method comprises: determining, whether a content of an application in the N applications is projected with the full-screen window by a projection unit of the electronic apparatus, and obtaining a determination result; setting a corresponding identity (ID) for an application, if the determination result indicates that the content of the application is projected; obtaining an operation, wherein the operation is used to switch a window of a k-th application among the N applications to a certain state, where 1≤k≤N; detecting whether the k-th application is provided with an ID, to obtain a first detection result; and setting a running state of the k-th application to a play state, if the first detection result indicates that the k-th application is provided with the ID, so that a content played by the k-th application is projected.

An electronic apparatus provided by an embodiment of the present invention has a display unit, and a projection unit; the display unit being capable of displaying N non-full-screen windows corresponding to N applications, where N≥1, wherein the electronic apparatus further comprises: a determining unit, for determining whether a content of an application in the N applications is projected by the projection unit with the full-screen window, and obtain a determination result; an identifying unit, for setting a corresponding ID for an application, if the determination result indicates that the content of the application is projected; an obtaining unit, for obtaining a first operation, wherein the operation is used to switch a window of a k-th application among the N applications to a certain state, where 1≤k≤N; a first detecting unit, for detecting whether the k-th application is provided with an ID, to obtain a first detection result; and a first processing unit, for setting a running state of the k-th application to a play state, if the first detection result indicates that the k-th application is provided with the ID, so that a content played by the k-th application is displayed.

In the technical solutions of the embodiments of the present invention, the electronic apparatus is capable of displaying the N non-full-screen windows corresponding to the N applications, where N≥1; and the electronic apparatus is capable of projecting the content of the j-th application in the N applications on the projection surface with the full-screen window, where 1≤j≤N, and setting the corresponding ID for the application, for the j-th application projected onto the projection surface with the full-screen window; so, when the non-full-screen window of the j-th application is minimized on the display unit, the electronic apparatus will detect that the j-th application is provided with the corresponding ID, and accordingly, set the running state of the j-th application to the play state, so that the content played by the j-th application is displayed on the projection surface by the projection unit with the full-screen window, and thereby, the content corresponding to the j-th application can continue to be played. In the technical solutions of the embodiments of the present invention, when the electronic apparatus minimizes the non-full-screen window of a certain application upon split-screen projection, although the non-full-screen window of the application cannot be seen on the current screen of the electronic apparatus, yet the projected content of the application can still be displayed on the expanded projection screen, which meets requirements of the user, and improves user experience.

BRIEF DESCRIPTION OF THE DRAWINGS

In order to describe the embodiments of the present disclosure or the technical solutions in the related art more clearly, hereinafter, the accompany drawings necessary to be used in the description of the embodiments will be introduced briefly. Apparently, the accompany drawings in the following description are only some embodiments of the present disclosure.

DETAILED DESCRIPTION

In order to understand characteristics and technical contents of the embodiments of the present invention in more detail, hereinafter, implementation of the embodiments of the present invention will be illustrated in detail in conjunction with the accompanying drawings, and the attached accompanying drawings only serve as reference for description, but are not intended to limit the embodiments of the present invention.

Figure 1:
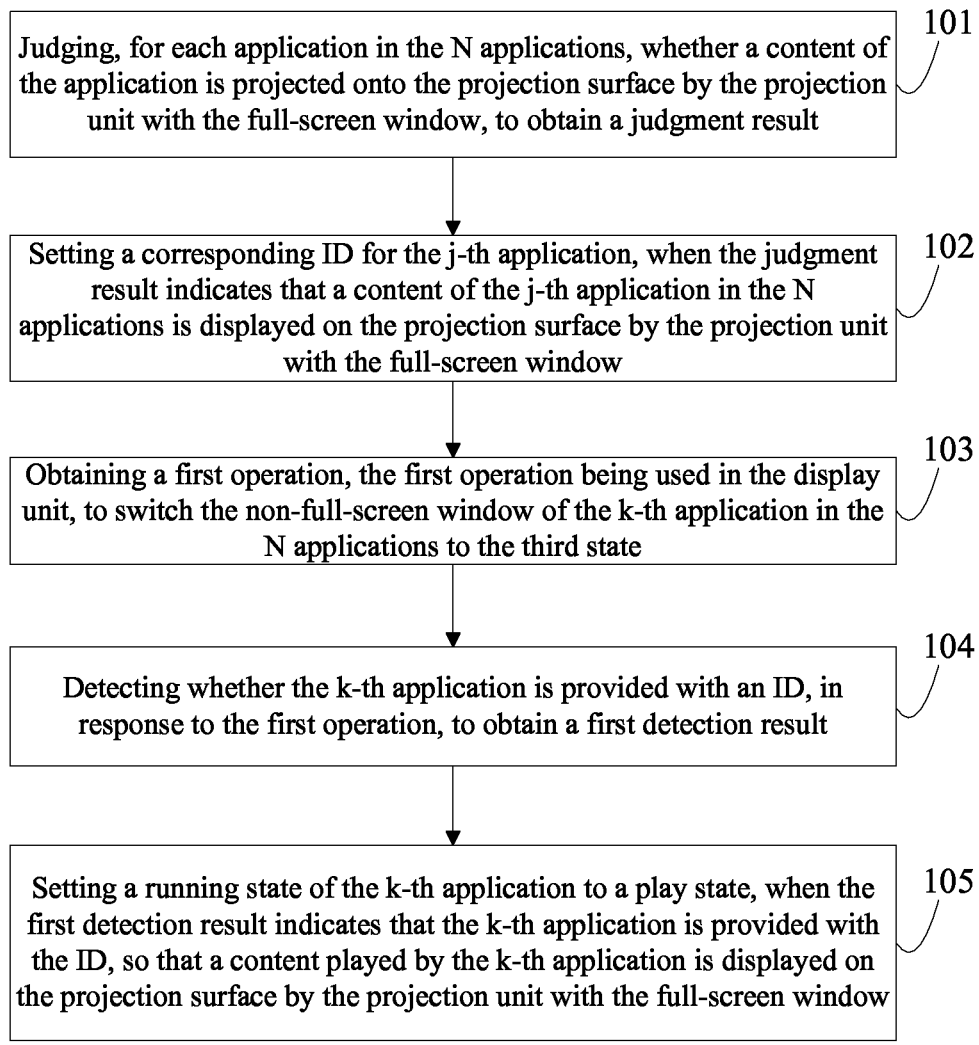
FIG. 1 is a schematic flowchart of an information processing method according to Embodiment One of the present invention.

FIG. 1 is a schematic flowchart of an information processing method according to Embodiment One of the present invention; the information processing method according to this embodiment being applied to an electronic apparatus, the electronic apparatus having a display unit, and a projection unit; the display unit being capable of displaying N non-full-screen windows corresponding to N applications, where N≥1, a display region of the non-full-screen window being smaller than a display region of a full-screen window of the display unit; wherein an i-th non-full-screen window in the N non-full-screen windows is in a first state, where 1≤i≤N, and non-full-screen windows other than the i-th non-full-screen window is in a second state or a third state; and the projection unit being capable of projecting a content of a j-th application in the N applications on a projection surface with the full-screen window, where 1≤j≤N; as shown in FIG. 1, the information processing method comprises steps of:

Step 101: determining, for each application in the N applications, whether a content of the application is projected onto the projection surface by the projection unit with the full-screen window, to obtain a determination result;

In the embodiment of the present invention, the electronic apparatus may be a mobile phone, a tablet personal computer, a game console or any other electronic apparatus. The electronic apparatus of such kind has a display unit and a projection unit.

The display unit refers to a display screen of the electronic apparatus, the display unit is capable of displaying the N non-full-screen windows corresponding to the N applications, where N≥1, the display region of the non-full-screen window being smaller than the display region of the full-screen window of the display unit. Here, the application may be a game application, a video play application, a document display application, a document play application, etc. The electronic apparatus according to the embodiment of the present invention especially refers to the electronic apparatus with an android operating system, on such basis, when the display unit of the electronic apparatus simultaneously display the N non-full-screen windows, one of which obtains a focus point to be in a focus state, the non-full-screen window in the focus state can accept an input operation of a user and can interact with the user, and the focus state in the embodiment of the present invention is referred to as a first state. However, the remaining non-full-screen windows are in a defocus state, the non-full-screen windows in the defocus state cannot directly interact with the user, unless the non-full-screen windows in the defocus state obtains the focus point, to be in the focus state, and the defocus state in the embodiment of the present invention is referred to as a second state. When the non-full-screen window is minimized, the non-full-screen window is hidden on the display unit, and the state in which the window is minimized in the embodiment of the present invention is referred to as a third state.

The projection unit can be implemented by a micro projector, and the projection unit has two working modes, which are full-screen projection and split-screen projection, respectively. The full-screen projection refers to that a projected content is exactly the same as a display content of the electronic apparatus; the split-screen projection refers to that the projected content is a content in a certain application window in the electronic apparatus, and the projection unit projects the content of the application with the full-screen window.

In the embodiment of the present invention, for each application displayed by the non-full-screen window on the display unit, firstly, it is determined whether the content of the application is projected onto the projection surface by the projection unit with the full-screen window, and for the application projected onto the projection surface by the projection unit with the full-screen window, step 102 below is executed.

Step 102: setting a corresponding ID for the j-th application, when the determination result indicates that a content of the j-th application in the N applications is displayed on the projection surface by the projection unit with the full-screen window.

In the embodiment of the present invention, for the j-th application, it must support that the non-full-screen window thereof, when minimized on the display unit, still maintains an active state, i.e., it supports that the content of the application continues to be played on the projection screen, for example, some played scenes which do not require user interaction, such as play of a video, play of a picture slide-show, and play of a PPT document. To this end, the j-th application should be provided with the corresponding ID, to specifically identify the application of such kind.

In the embodiment of the present invention, the non-full-screen window corresponding to each application is implemented by a window component, the window component is Activity, the Activity is managed by an Activity stack, a state of an Activity example decides a position thereof in the stack, the Activity in the focus state is always on the top of the stack, when the Activity in the focus state is destroyed due to anomalies or other reasons, the Activity located on a second layer of the stack will be activated and float to the top of the stack. When a new Activity starts to enter the stack, the original Activity will be pushed to the second layer of the stack. A position change of an Activity in the stack reflects its conversion between different states. Each Activity corresponds to a stack address, and therefore, the corresponding ID is set for the j-th application with respect to the stack address by a multi-window management module.

Step 103: obtaining a first operation, the first operation being used in the display unit, to switch the non-full-screen window of the k-th application in the N applications to the third state.

Where, 1≤k≤N.

In the embodiment of the present invention, the first operation may be triggered by the user, for example, the non-full-screen window of the k-th application has a zoom-out icon, and the user can click the icon to trigger the first operation, so as to zoom out the non-full-screen window of the k-th application.

Step 104: detecting whether the k-th application is provided with an ID, in response to the first operation, to obtain a first detection result.

In the embodiment of the present invention, for the application with a zoomed-out window, it is necessary to detect whether the application is provided with the ID, the application provided with the ID is just the application currently displayed on the projection surface by the projection unit with the full-screen window, and the application not provided with the ID is just the application not displayed on the projection surface by the projection unit with the full-screen window.

Step 105: setting a running state of the k-th application to a play state, when the first detection result indicates that the k-th application is provided with the ID, so that a content played by the k-th application is displayed on the projection surface by the projection unit with the full-screen window.

In the embodiment of the present invention, when the first detection result indicates that the k-th application is provided with the ID, the k-th application is displayed on the projection surface with the full-screen window, even if the non-full-screen window of the k-th application is zoomed out, the k-th application is still in the active state, specifically, the running state of the k-th application is set to the play state, and thereby, the content played by the k-th application can be displayed on the projection surface by the projection unit with the full-screen window.

In the technical solutions of the embodiments of the present invention, when the electronic apparatus minimizes the non-full-screen window of a certain application upon split-screen projection, although the non-full-screen window of the application cannot be seen on the current screen of the electronic apparatus, yet the projected content of the application can still be displayed on the expanded projection screen, which meets requirements of the user, and improves user experience.

Figure 2:
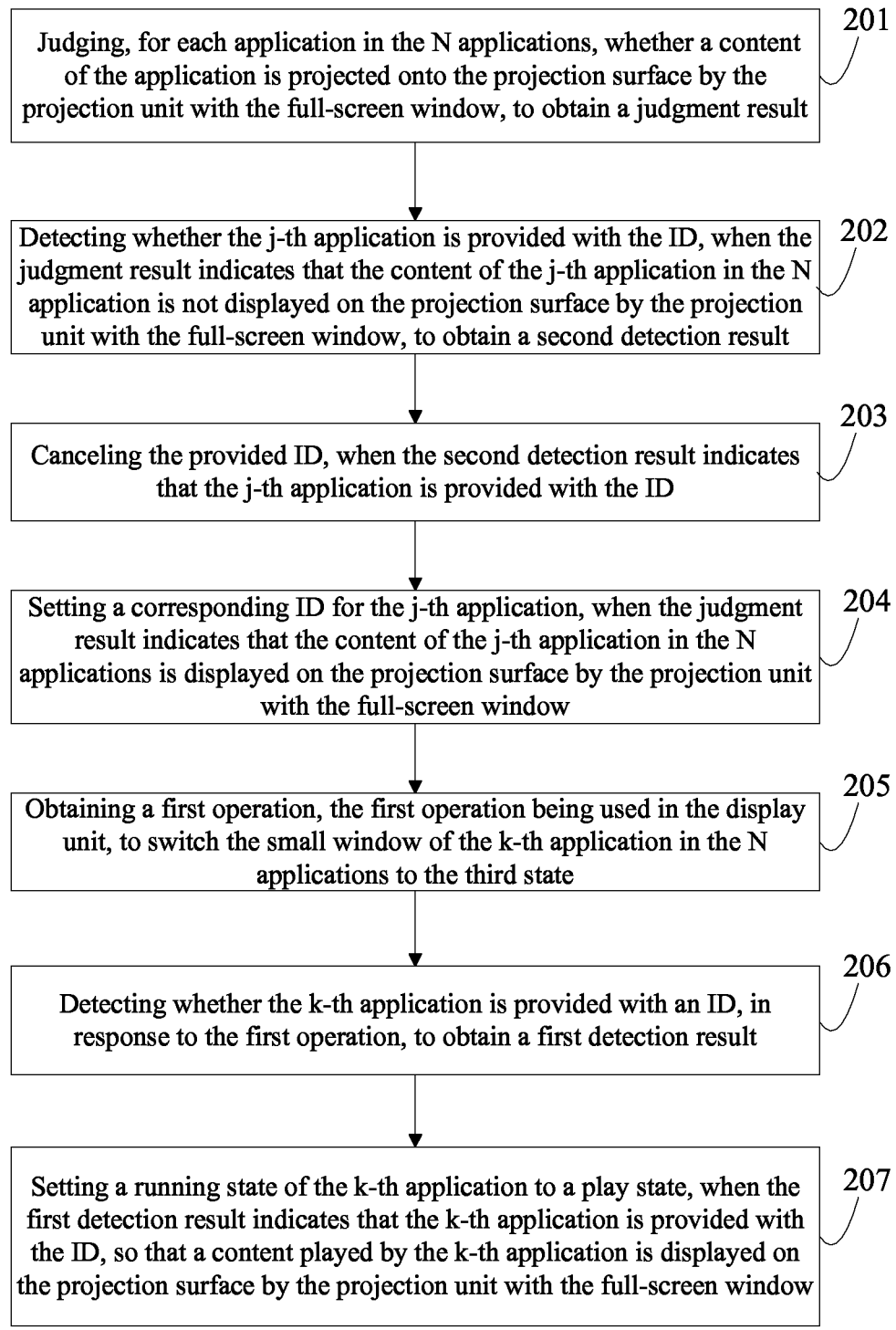
FIG. 2 is a schematic flowchart of an information processing method according to Embodiment Two of the present invention.

FIG. 2 is a schematic flowchart of an information processing method according to Embodiment Two of the present invention; the information processing method according to this embodiment being applied to an electronic apparatus, the electronic apparatus having a display unit, and a projection unit; the display unit being capable of displaying N non-full-screen windows corresponding to N applications, where N≥1, a display region of the non-full-screen window being smaller than a display region of a full-screen window of the display unit; wherein an i-th non-full-screen window in the N non-full-screen windows is in a first state, where 1≤i≤N, and non-full-screen windows other than the i-th non-full-screen window is in a second state or a third state; and the projection unit being capable of projecting a content of a j-th application in the N applications on a projection surface with the full-screen window, where 1≤j≤N; as shown in FIG. 2, the information processing method comprises steps of:

Step 201: determining, for each application in the N applications, whether a content of the application is projected onto the projection surface by the projection unit with the full-screen window, to obtain a determination result.

In the embodiment of the present invention, the electronic apparatus may be a mobile phone, a tablet personal computer, a game console or any other electronic apparatus. The electronic apparatus of such kind has a display unit and a projection unit.

The display unit refers to a display screen of the electronic apparatus, the display unit is capable of displaying the N non-full-screen windows corresponding to the N applications, where N≥1, the display region of the non-full-screen window being smaller than the display region of the full-screen window of the display unit. Here, the application may be a game application, a video play application, a document display application, a document play application, etc. The electronic apparatus according to the embodiment of the present invention especially refers to the electronic apparatus with an android operating system, on such basis, when the display unit of the electronic apparatus simultaneously display the N non-full-screen windows, one of which obtains a focus point, to be in a focus state, the non-full-screen window in the focus state can accept an input operation of a user and can interact with the user, and the focus state in the embodiment of the present invention is referred to as a first state. However, the remaining non-full-screen windows are in a defocus state, the non-full-screen windows in the defocus state cannot directly interact with the user, unless the non-full-screen windows in the defocus state obtains the focus point, to be in the focus state, and the defocus state in the embodiment of the present invention is referred to as a second state. When the non-full-screen window is minimized, the non-full-screen window is hidden on the display unit, and the state in which the window is minimized in the embodiment of the present invention is referred to as a third state.

The projection unit can be implemented by a micro projector, and the projection unit has two working modes, which are full-screen projection and split-screen projection, respectively. The full-screen projection refers to that a projected content is exactly the same as a display content of the electronic apparatus; the split-screen projection refers to that the projected content is a content in a certain application window in the electronic apparatus, and the projection unit projects the content of the application with the full-screen window.

In the embodiment of the present invention, for each application displayed by the non-full-screen window on the display unit, firstly, it is determined whether the content of the application is projected onto the projection surface by the projection unit with the full-screen window, and for the application not projected onto the projection surface by the projection unit with the full-screen window, step 202 below is executed. For the application projected onto the projection surface by the projection unit with the full-screen window, step 204 below is executed.

Step 202: detecting whether the j-th application is provided with the ID, when the determination result indicates that the content of the j-th application in the N application is not displayed on the projection surface by the projection unit with the full-screen window, to obtain a second detection result.

In the embodiment of the present invention, for the application not projected onto the projection surface by the projection unit with the full-screen window, it is necessary to detect whether the application is provided with the ID; considering that if some applications are once projected onto the projection surface by the projection unit with the full-screen window, then these applications are provided with the ID, but at the current time, these applications are not projected onto the projection surface by the projection unit with the full-screen window, it is necessary to cancel the previously provided ID, to participate step 203 below.

Step 203: canceling the provided ID, when the second detection result indicates that the j-th application is provided with the ID.

Step 204: setting a corresponding ID for the j-th application, when the determination result indicates that the content of the j-th application in the N applications is displayed on the projection surface by the projection unit with the full-screen window.

In the embodiment of the present invention, for the j-th application, it must support that the non-full-screen window thereof, when minimized on the display unit, still maintains an active state, i.e., it supports that the content of the application continues to be played on the projection screen, for example, some played scenes which do not require user interaction, such as play of a video, play of a picture slide-show, and play of a PPT document. To this end, the j-th application should be provided with the corresponding ID, to specifically identify the application of such kind.

In the embodiment of the present invention, the non-full-screen window corresponding to each application is implemented by a window component, the window component is Activity, the Activity is managed by an Activity stack, a state of an Activity example decides a position thereof in the stack, the Activity in the focus state is always on the top of the stack, when the Activity in the focus state is destroyed due to anomalies or other reasons, the Activity located on a second layer of the stack will be activated and float to the top of the stack. When a new Activity starts to enter the stack, the original Activity will be pushed to the second layer of the stack. A position change of an Activity in the stack reflects its conversion between different states. Each Activity corresponds to a stack address, and therefore, the corresponding ID is set for the j-th application with respect to the stack address by a multi-window management module.

Step 205: obtaining a first operation, the first operation being used in the display unit, to switch the non-full-screen window of the k-th application in the N applications to the third state.

Where, $1 \le k \le N$.

In the embodiment of the present invention, the first operation may be triggered by the user, for example, the non-full-screen window of the k-th application has a zoom-out icon, and the user can click the icon to trigger the first operation, so as to zoom out the non-full-screen window of the k-th application.

Step 206: detecting whether the k-th application is provided with an ID, in response to the first operation, to obtain a first detection result.

In the embodiment of the present invention, for the application with a zoomed-out window, it is necessary to detect whether the application is provided with the ID, the application provided with the ID is just the application currently displayed on the projection surface by the projection unit with the full-screen window, and the application not provided with the ID is just the application not displayed on the projection surface by the projection unit with the full-screen window.

Step 207: setting a running state of the k-th application to a play state, when the first detection result indicates that the k-th application is provided with the ID, so that a content played by the k-th application is displayed on the projection surface by the projection unit with the full-screen window.

In the embodiment of the present invention, when the first detection result indicates that the k-th application is provided with the ID, the k-th application is displayed on the projection surface with the full-screen window, even if the non-full-screen window of the k-th application is zoomed out, the k-th application is still in the active state, specifically, the running state of the k-th application is set to the play state, and thereby, the content played by the k-th application can be displayed on the projection surface by the projection unit with the full-screen window.

In the technical solutions of the embodiments of the present invention, when the electronic apparatus minimizes the non-full-screen window of a certain application upon split-screen projection, although the non-full-screen window of the application cannot be seen on the current screen of the electronic apparatus, yet the projected content of the application can still be displayed on the expanded projection screen, which meets requirements of the user, and improves user experience.

Figure 3:
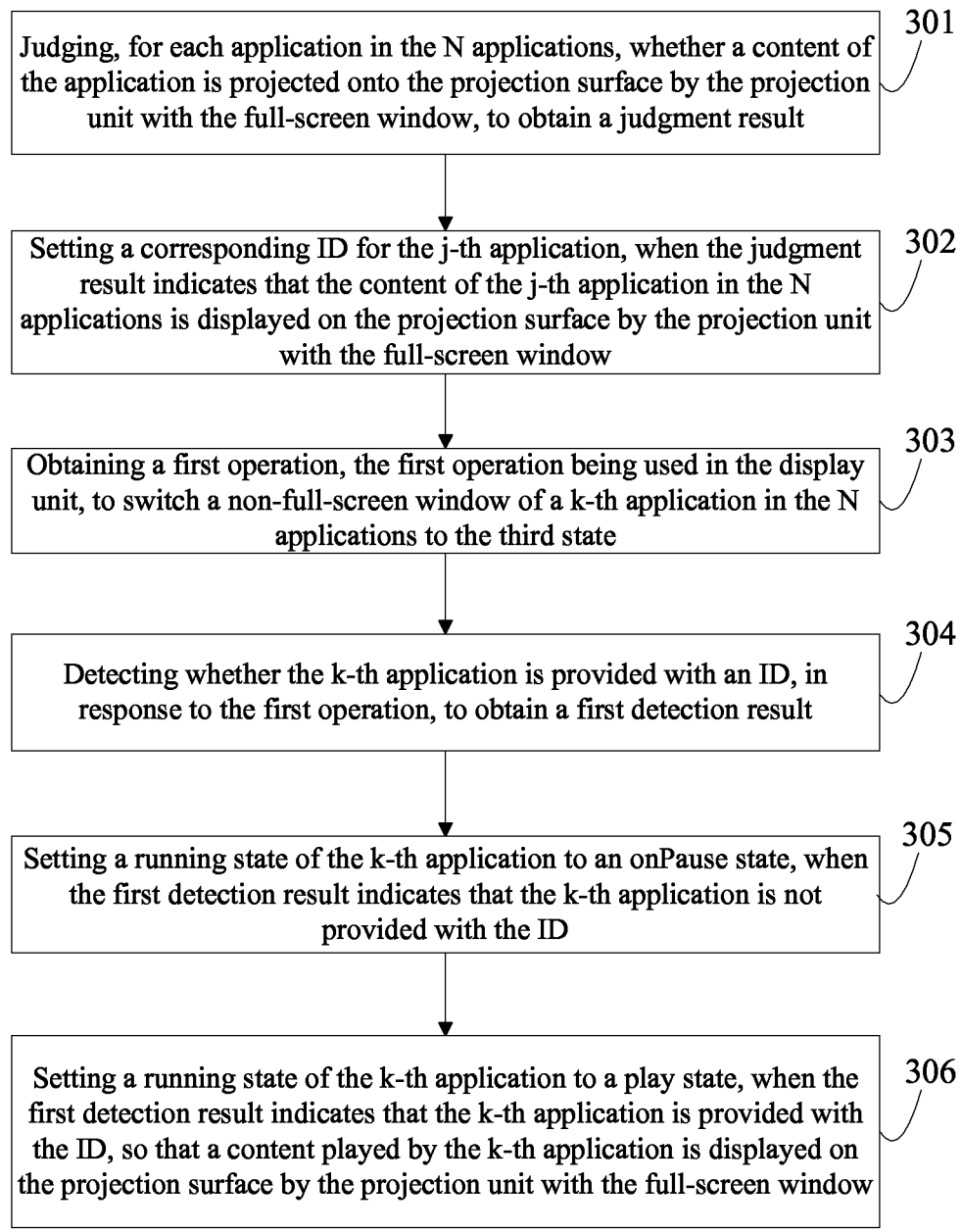
FIG. 3 is a schematic flowchart of an information processing method according to Embodiment Three of the present invention.

FIG. 3 is a schematic flowchart of an information processing method according to Embodiment Three of the present invention; the information processing method according to this embodiment being applied to an electronic apparatus, the electronic apparatus having a display unit, and a projection unit; the display unit being capable of displaying N non-full-screen windows corresponding to N applications, where $N \ge 1$, a display region of the non-full-screen window being smaller than a display region of a full-screen window of the display unit; wherein an i-th non-full-screen window in the N non-full-screen windows is in a first state, where $1 \le i \le N$, and non-full-screen windows other than the i-th non-full-screen window is in a second state or a third state; and the projection unit being capable of projecting a content of a j-th application in the N applications on a projection surface with the full-screen window, where $1 \le j \le N$; as shown in FIG. 3, the information processing method comprises steps of:

Step 301: determining, for each application in the N applications, whether a content of the application is projected onto the projection surface by the projection unit with the full-screen window, to obtain a determination result.

In the embodiment of the present invention, the electronic apparatus may be a mobile phone, a tablet personal computer, a game console or any other electronic apparatus. The electronic apparatus of such kind has a display unit and a projection unit.

The display unit refers to a display screen of the electronic apparatus, the display unit is capable of displaying the N non-full-screen windows corresponding to the N applications, where $N \ge 1$, the display region of the non-full-screen window being smaller than the display region of the full-screen window of the display unit. Here, the application may be a game application, a video play application, a document display application, a document play application, etc. The electronic apparatus according to the embodiment of the present invention especially refers to the electronic apparatus with an android operating system, on such basis, when the display unit of the electronic apparatus simultaneously display the N non-full-screen windows, one of which obtains a focus point, to be in a focus state, the non-full-screen window in the focus state can accept an input operation of a user and can interact with the user, and the focus state in the embodiment of the present invention is referred to as a first state. However, the remaining non-full-screen windows are in a defocus state, the non-full-screen windows in the defocus state cannot directly interact with the user, unless the non-full-screen windows in the defocus state obtains the focus point, to be in the focus state, and the defocus state in the embodiment of the present invention is referred to as a second state. When the non-full-screen window is minimized, the non-full-screen window is hidden on the display unit, and the state in which the window is minimized in the embodiment of the present invention is referred to as a third state.

The projection unit can be implemented by a micro projector, and the projection unit has two working modes, which are full-screen projection and split-screen projection, respectively. The full-screen projection refers to that a projected content is exactly the same as a display content of the electronic apparatus; the split-screen projection refers to that the projected content is a content in a certain application window in the electronic apparatus, and the projection unit projects the content of the application with the full-screen window.

In the embodiment of the present invention, for each application displayed by the non-full-screen window on the display unit, firstly, it is determined whether the content of the application is projected onto the projection surface by the projection unit with the full-screen window, and for the application projected onto the projection surface by the projection unit with the full-screen window, step 302 below is executed.

Step 302: setting a corresponding ID for the j-th application, when the determination result indicates that the content of the j-th application in the N applications is displayed on the projection surface by the projection unit with the full-screen window.

In the embodiment of the present invention, for the j-th application, it must support that the non-full-screen window thereof, when minimized on the display unit, still maintains an active state, i.e., it supports that the content of the application continues to be played on the projection screen, for example, some played scenes which do not require user interaction, such as play of a video, play of a picture slide-show, and play of a PPT document. To this end, the j-th application should be provided with the corresponding ID, to specifically identify the application of such kind.

In the embodiment of the present invention, the non-full-screen window corresponding to each application is implemented by a window component, the window component is Activity, the Activity is managed by an Activity stack, a state of an Activity example decides a position thereof in the stack, the Activity in the focus state is always on the top of the stack, when the Activity in the focus state is destroyed due to anomalies or other reasons, the Activity located on a second layer of the stack will be activated and float to the top of the stack. When a new Activity starts to enter the stack, the original Activity will be pushed to the second layer of the stack. A position change of an Activity in the stack reflects its conversion between different states. Each Activity corresponds to a stack address, and therefore, the corresponding ID is set for the j-th application with respect to the stack address by a multi-window management module.

Step 303: obtaining a first operation, the first operation being used in the display unit, to switch a non-full-screen window of a k-th application in the N applications to the third state.

Where, 1≤k≤N.

In the embodiment of the present invention, the first operation may be triggered by the user, for example, the non-full-screen window of the k-th application has a zoom-out icon, and the user can click the icon to trigger the first operation, so as to zoom out the non-full-screen window of the k-th application.

Step 304: detecting whether the k-th application is provided with an ID, in response to the first operation, to obtain a first detection result.

In the embodiment of the present invention, for the application with a zoomed-out window, it is necessary to detect whether the application is provided with the ID, the application provided with the ID is just the application currently displayed on the projection surface by the projection unit with the full-screen window, and the application not provided with the ID is just the application not displayed on the projection surface by the projection unit with the full-screen window.

Step 305: setting a running state of the k-th application to an onPause state, when the first detection result indicates that the k-th application is not provided with the ID.

In the embodiment of the present invention, when the first detection result indicates that the k-th application is not provided with the ID, the k-th application is not displayed on the projection surface, when the non-full-screen window of the k-th application is zoomed out, the running state of the k-th application is set to the onPause state. Specifically, an onPause message may be sent to the Activity corresponding to the k-th application, so that the running state of the k-th application is the onPause state.

Step 306: setting a running state of the k-th application to a play state, when the first detection result indicates that the k-th application is provided with the ID, so that a content played by the k-th application is displayed on the projection surface by the projection unit with the full-screen window.

In the embodiment of the present invention, when the first detection result indicates that the k-th application is provided with the ID, the k-th application is displayed on the projection surface with the full-screen window, even if the non-full-screen window of the k-th application is zoomed out, the k-th application is still in the active state, specifically, the running state of the k-th application is set to the play state, and thereby, the content played by the k-th application can be displayed on the projection surface by the projection unit with the full-screen window. Specifically, the onPause message sent to the Activity corresponding to the k-th application is intercepted, so that the running state of the k-th application is the play state.

In the technical solutions of the embodiments of the present invention, when the electronic apparatus minimizes the non-full-screen window of a certain application upon split-screen projection, although the non-full-screen window of the application cannot be seen on the current screen of the electronic apparatus, yet the projected content of the application can still be displayed on the expanded projection screen, which meets requirements of the user, and improves user experience.

Figure 4:
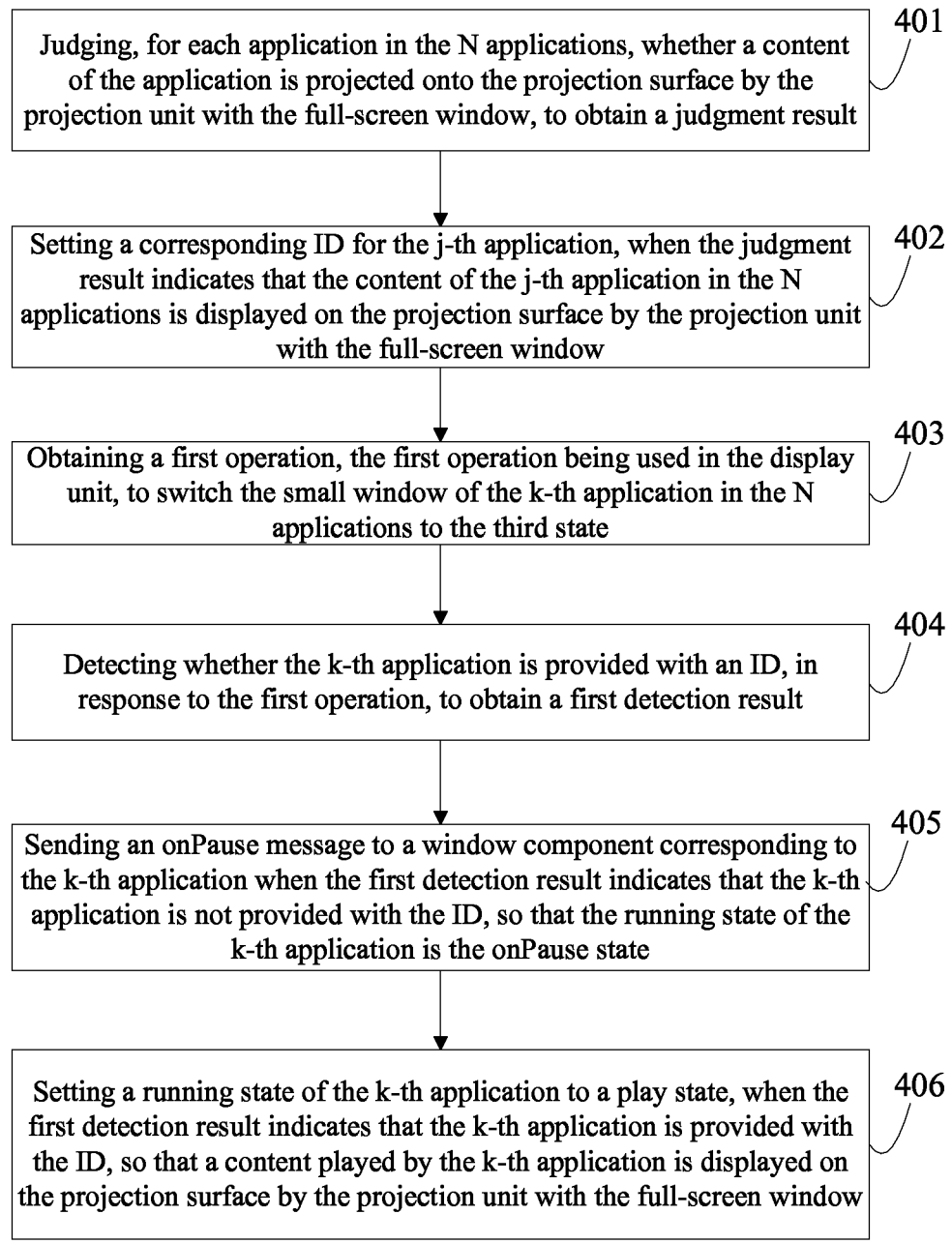
FIG. 4 is a schematic flowchart of an information processing method according to Embodiment Four of the present invention.

FIG. 4 is a schematic flowchart of an information processing method according to Embodiment Four of the present invention; the information processing method according to this embodiment being applied to an electronic apparatus, the electronic apparatus having a display unit, and a projection unit; the display unit being capable of displaying N non-full-screen windows corresponding to N applications, where N≥1, a display region of the non-full-screen window being smaller than a display region of a full-screen window of the display unit; wherein an i-th non-full-screen window in the N non-full-screen windows is in a first state, where 1≤i≤N, and non-full-screen windows other than the i-th non-full-screen window is in a second state or a third state; and the projection unit being capable of projecting a content of a j-th application in the N applications on a projection surface with the full-screen window, where 1≤j≤N; as shown in FIG. 4, the information processing method comprises steps of:

Step 401: determining, for each application in the N applications, whether a content of the application is projected onto the projection surface by the projection unit with the full-screen window, to obtain a determination result.

In the embodiment of the present invention, the electronic apparatus may be a mobile phone, a tablet personal computer, a game console or any other electronic apparatuses. The electronic apparatus of such kind has a display unit and a projection unit.

The display unit refers to a display screen of the electronic apparatus, the display unit is capable of displaying the N non-full-screen windows corresponding to the N applications, where N≥1, the display region of the non-full-screen window being smaller than the display region of the full-screen window of the display unit. Here, the application may be a game application, a video play application, a document display application, a document play application, etc. The electronic apparatus according to the embodiment of the present invention especially refers to the electronic apparatus with an android operating system, on such basis, when the display unit of the electronic apparatus simultaneously display the N non-full-screen windows, one of which obtains a focus point, to be in a focus state, the non-full-screen window in the focus state can accept an input operation of a user and can interact with the user, and the focus state in the embodiment of the present invention is referred to as a first state. However, the remaining non-full-screen windows are in a defocus state, the non-full-screen windows in the defocus state cannot directly interact with the user, unless the non-full-screen windows in the defocus state obtains the focus point, to be in the focus state, and the defocus state in the embodiment of the present invention is referred to as a second state. When the non-full-screen window is minimized, the non-full-screen window is hidden on the display unit, and the state in which the window is minimized in the embodiment of the present invention is referred to as a third state.

The projection unit can be implemented by a micro projector, and the projection unit has two working modes, which are full-screen projection and split-screen projection, respectively. The full-screen projection refers to that a projected content is exactly the same as a display content of the electronic apparatus; the split-screen projection refers to that the projected content is a content in a certain application window in the electronic apparatus, and the projection unit projects the content of the application with the full-screen window.

In the embodiment of the present invention, for each application displayed by the non-full-screen window on the display unit, firstly, it is determined whether the content of the application is projected onto the projection surface by the projection unit with the full-screen window, and for the application projected onto the projection surface by the projection unit with the full-screen window, step 402 below is executed.

Step 402: setting a corresponding ID for the j-th application, when the determination result indicates that the content of the j-th application in the N applications is displayed on the projection surface by the projection unit with the full-screen window.

In the embodiment of the present invention, for the j-th application, it must support that when the non-full-screen window thereof, when minimized on the display unit, still maintains an active state, i.e., it supports that the content of the application continues to be played on the projection screen, for example, some played scenes which do not require user interaction, such as play of a video, play of a picture slide-show, and play of a PPT document. To this end, the j-th application should be provided with the corresponding ID, to specifically identify the application of such kind.

In the embodiment of the present invention, the non-full-screen window corresponding to each application is implemented by a window component, the window component is Activity, the Activity is managed by an Activity stack, a state of an Activity example decides a position thereof in the stack, the Activity in the focus state is always on the top of the stack, when the Activity in the focus state is destroyed due to anomalies or other reasons, the Activity located on a second layer of the stack will be activated and float to the top of the stack. When a new Activity starts to enter the stack, the original Activity will be pushed to the second layer of the stack. A position change of an Activity in the stack reflects its conversion between different states. Each Activity corresponds to a stack address, and therefore, the corresponding ID is set for the j-th application with respect to the stack address by a multi-window management module.

Step 403: obtaining a first operation, the first operation being used in the display unit, to switch the non-full-screen window of the k-th application in the N applications to the third state.

Where, 1≤k≤N.

In the embodiment of the present invention, the first operation may be triggered by the user, for example, the non-full-screen window of the k-th application has a zoom-out icon, and the user can click the icon to trigger the first operation, so as to zoom out the non-full-screen window of the k-th application.

Step 404: detecting whether the k-th application is provided with an ID, in response to the first operation, to obtain a first detection result.

In the embodiment of the present invention, for the application with a zoomed-out window, it is necessary to detect whether the application is provided with the ID, the application provided with the ID is just the application currently displayed on the projection surface by the projection unit with the full-screen window, and the application not provided with the ID is just the application not displayed on the projection surface by the projection unit with the full-screen window.

Step 405: sending an onPause message to a window component corresponding to the k-th application when the first detection result indicates that the k-th application is not provided with the ID, so that the running state of the k-th application is the onPause state.

In the embodiment of the present invention, when the first detection result indicates that the k-th application is not provided with the ID, the k-th application is not displayed on the projection surface, when the non-full-screen window of the k-th application is zoomed out, the running state of the k-th application is set to the onPause state. Specifically, the onPause message may be sent to the Activity corresponding to the k-th application, so that the running state of the k-th application is the onPause state.

Step 406: setting a running state of the k-th application to a play state, when the first detection result indicates that the k-th application is provided with the ID, so that a content played by the k-th application is displayed on the projection surface by the projection unit with the full-screen window.

In the embodiment of the present invention, when the first detection result indicates that the k-th application is provided with the ID, the k-th application is displayed on the projection surface with the full-screen window, even if the non-full-screen window of the k-th application is zoomed out, the k-th application is still in the active state, specifically, the running state of the k-th application is set to the play state, and thereby, the content played by the k-th application can be displayed on the projection surface by the projection unit with the full-screen window. Specifically, the onPause message sent to the Activity corresponding to the k-th application is intercepted, so that the running state of the k-th application is the play state.

In the technical solutions of the embodiments of the present invention, when the electronic apparatus minimizes the non-full-screen window of a certain application upon split-screen projection, although the non-full-screen window of the application cannot be seen on the current screen of the electronic apparatus, yet the projected content of the application can still be displayed on the expanded projection screen, which meets requirements of the user, and improves user experience.

Figure 5:
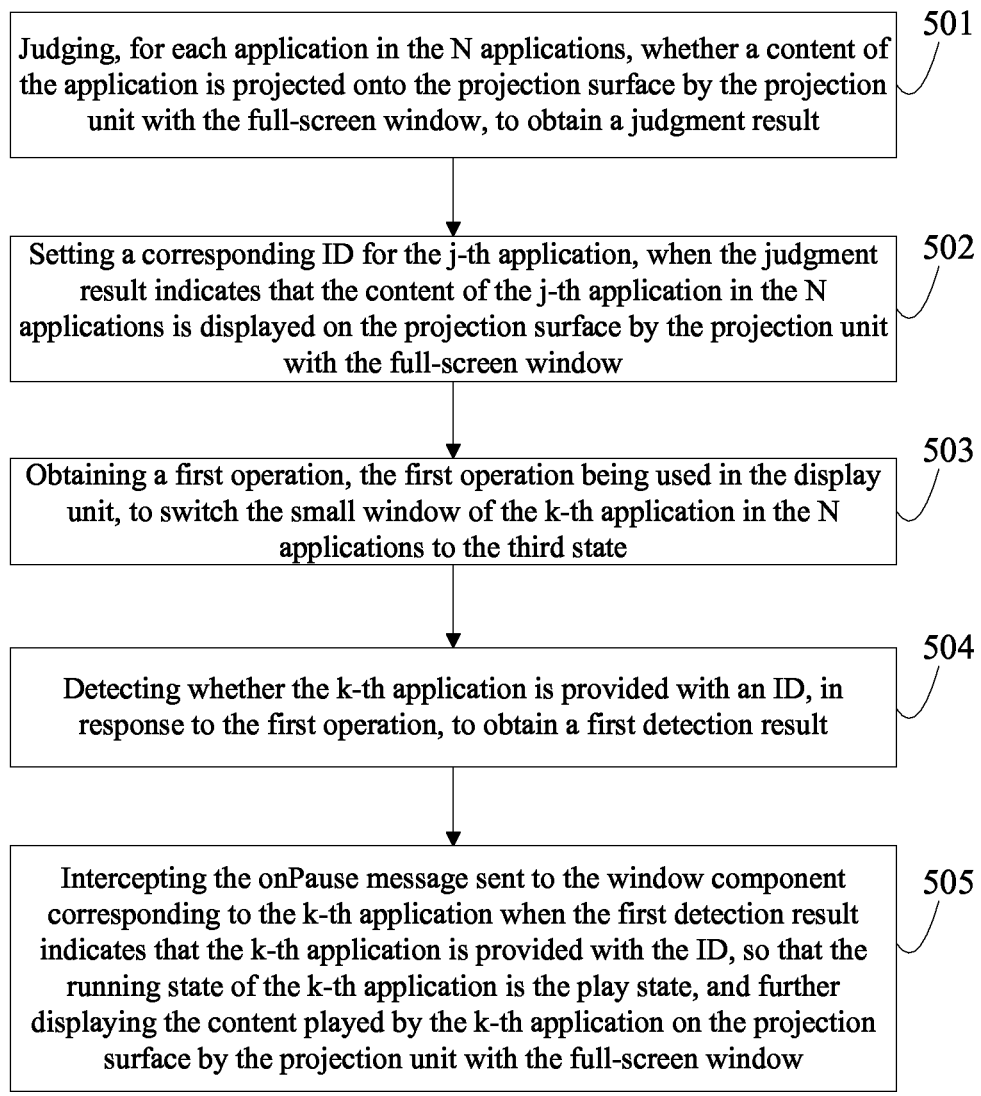
FIG. 5 is a schematic flowchart of an information processing method according to Embodiment Five of the present invention.

FIG. 5 is a schematic flowchart of an information processing method according to Embodiment Five of the present invention; the information processing method according to this embodiment being applied to an electronic apparatus, the electronic apparatus having a display unit, and a projection unit; the display unit being capable of displaying N non-full-screen windows corresponding to N applications, where $N \geq 1$, a display region of the non-full-screen window being smaller than a display region of a full-screen window of the display unit; wherein an i-th non-full-screen window in the N non-full-screen windows is in a first state, where $1 \leq i \leq N$, and non-full-screen windows other than the i-th non-full-screen window is in a second state or a third state; and the projection unit being capable of projecting a content of a j-th application in the N applications on a projection surface with the full-screen window, where $1 \leq j \leq N$; as shown in FIG. 5, the information processing method comprises steps of:

Step 501: determining, for each application in the N applications, whether a content of the application is projected onto the projection surface by the projection unit with the full-screen window, to obtain a determination result.

In the embodiment of the present invention, the electronic apparatus may be a mobile phone, a tablet personal computer, a game console or any other electronic apparatus. The electronic apparatus of such kind has a display unit and a projection unit.

The display unit refers to a display screen of the electronic apparatus, the display unit is capable of displaying the N non-full-screen windows corresponding to the N applications, where $N \geq 1$, the display region of the non-full-screen window being smaller than the display region of the full-screen window of the display unit. Here, the application may be a game application, a video play application, a document display application, a document play application, etc. The electronic apparatus according to the embodiment of the present invention especially refers to the electronic apparatus with an android operating system, on such basis, when the display unit of the electronic apparatus simultaneously display the N non-full-screen windows, one of which obtains a focus point, to be in a focus state, the non-full-screen window in the focus state can accept an input operation of a user and can interact with the user, and the focus state in the embodiment of the present invention is referred to as a first state. However, the remaining non-full-screen windows are in a defocus state, the non-full-screen windows in the defocus state cannot directly interact with the user, unless the non-full-screen windows in the defocus state obtains the focus point, to be in the focus state, and the defocus state in the embodiment of the present invention is referred to as a second state. When the non-full-screen window is minimized, the non-full-screen window is hidden on the display unit, and the state in which the window is minimized in the embodiment of the present invention is referred to as a third state.

The projection unit can be implemented by a micro projector, and the projection unit has two working modes, which are full-screen projection and split-screen projection, respectively. The full-screen projection refers to that a projected content is exactly the same as a display content of the electronic apparatus; the split-screen projection refers to that the projected content is a content in a certain application window in the electronic apparatus, and the projection unit projects the content of the application with the full-screen window.

In the embodiment of the present invention, for each application displayed by the non-full-screen window on the display unit, firstly, it is determined whether the content of the application is projected onto the projection surface by the projection unit with the full-screen window, and for the application projected onto the projection surface by the projection unit with the full-screen window, step 502 below is executed.

Step 502: setting a corresponding ID for the j-th application, when the determination result indicates that the content of the j-th application in the N applications is displayed on the projection surface by the projection unit with the full-screen window.

In the embodiment of the present invention, for the j-th application, it must support that the non-full-screen window thereof, when minimized on the display unit, still maintains an active state, i.e., it supports that the content of the application continues to be played on the projection screen, for example, some played scenes which do not require user interaction, such as play of a video, play of a picture slide-show, and play of a PPT document. To this end, the j-th application should be provided with the corresponding ID, to specifically identify the application of such kind.

In the embodiment of the present invention, the non-full-screen window corresponding to each application is implemented by a window component, the window component is Activity, the Activity is managed by an Activity stack, a state of an Activity example decides a position thereof in the stack, the Activity in the focus state is always on the top of the stack, when the Activity in the focus state is destroyed due to anomalies or other reasons, the Activity located on a second layer of the stack will be activated and float to the top of the stack. When a new Activity starts to enter the stack, the original Activity will be pushed to the second layer of the stack. A position change of an Activity in the stack reflects its conversion between different states. Each Activity corresponds to a stack address, and therefore, the corresponding ID is set for the j-th application with respect to the stack address by a multi-window management module.

Step 503: obtaining a first operation, the first operation being used in the display unit, to switch the non-full-screen window of the k-th application in the N applications to the third state.

Where, $1 \leq k \leq N$.

In the embodiment of the present invention, the first operation may be triggered by the user, for example, the non-full-screen window of the k-th application has a zoom-out icon, and the user can click the icon to trigger the first operation, so as to zoom out the non-full-screen window of the k-th application.

Step 504: detecting whether the k-th application is provided with an ID, in response to the first operation, to obtain a first detection result.

In the embodiment of the present invention, for the application with a zoomed-out window, it is necessary to detect whether the application is provided with the ID, the application provided with the ID is just the application currently displayed on the projection surface by the projection unit with the full-screen window, and the application not provided with the ID is just the application not displayed on the projection surface by the projection unit with the full-screen window.

Step 505: intercepting the onPause message sent to the window component corresponding to the k-th application when the first detection result indicates that the k-th application is provided with the ID, so that the running state of the k-th application is the play state, and further displaying the content played by the k-th application on the projection surface by the projection unit with the full-screen window.

In the embodiment of the present invention, each application in the N applications corresponds to a window component.

In the embodiment of the present invention, when the first detection result indicates that the k-th application is provided with the ID, the k-th application is displayed on the projection surface with the full-screen window, even if the non-full-screen window of the k-th application is zoomed out, the k-th application is still in the active state, specifically, the running state of the k-th application is set to the play state, and thereby, the content played by the k-th application can be displayed on the projection surface by the projection unit with the full-screen window.

In the technical solutions of the embodiments of the present invention, when the electronic apparatus minimizes the non-full-screen window of a certain application upon split-screen projection, although the non-full-screen window of the application cannot be seen on the current screen of the electronic apparatus, yet the projected content of the application can still be displayed on the expanded projection screen, which meets requirements of the user, and improves user experience.

Figure 6:
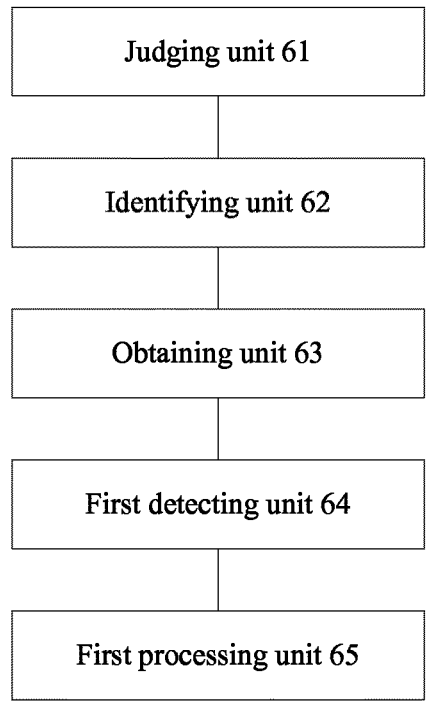
FIG. 6 is a structural composition schematic diagram of an electronic apparatus according to Embodiment One of the present invention.

FIG. 6 is a structural composition schematic diagram of an electronic apparatus according to Embodiment One of the present invention; the electronic apparatus in this embodiment having a display unit, and a projection unit; the display unit being capable of displaying N non-full-screen windows corresponding to N applications, where N≥1, a display region of the non-full-screen window being smaller than a display region of a full-screen window of the display unit; wherein an i-th non-full-screen window in the N non-full-screen windows is in a first state, where 1≤i≤N, and non-full-screen windows other than the i-th non-full-screen window is in a second state or a third state; and the projection unit being capable of projecting a content of a j-th application in the N applications onto a projection surface with the full-screen window, where 1≤j≤N; the electronic apparatus further comprising:

A determining unit 61, for determining, for each application in the N applications, whether a content of the application is projected onto the projection surface by the projection unit with the full-screen window, to obtain a determination result;

An identifying unit 62, for setting a corresponding ID for the j-th application, when the determination result indicates that the content of the j-th application in the N applications is displayed on the projection surface by the projection unit with the full-screen window;

An obtaining unit 63, for obtaining a first operation, the first operation being used in the display unit, to switch a non-full-screen window of a k-th application in the N applications to the third state, where 1≤k≤N;

A first detecting unit 64, for detecting whether the k-th application is provided with an ID, in response to the first operation, to obtain a first detection result; and A first processing unit 65, for setting a running state of the k-th application to a play state, when the first detection result indicates that the k-th application is provided with the ID, so that a content played by the k-th application is displayed on the projection surface by the projection unit with the full-screen window.

Those skilled in the art should appreciate that, functions implemented by respective units in the electronic apparatus according to the embodiment of the present invention may be interpreted with reference to relevant description for the foregoing light detection method; and the respective units in the electronic apparatus according to the embodiment of the present invention may be implemented by an analog circuit of the functions according to the embodiment of the present invention, and may also be implemented by running software that performs the functions according to the embodiment of the present invention on an intelligent terminal.

Figure 7:
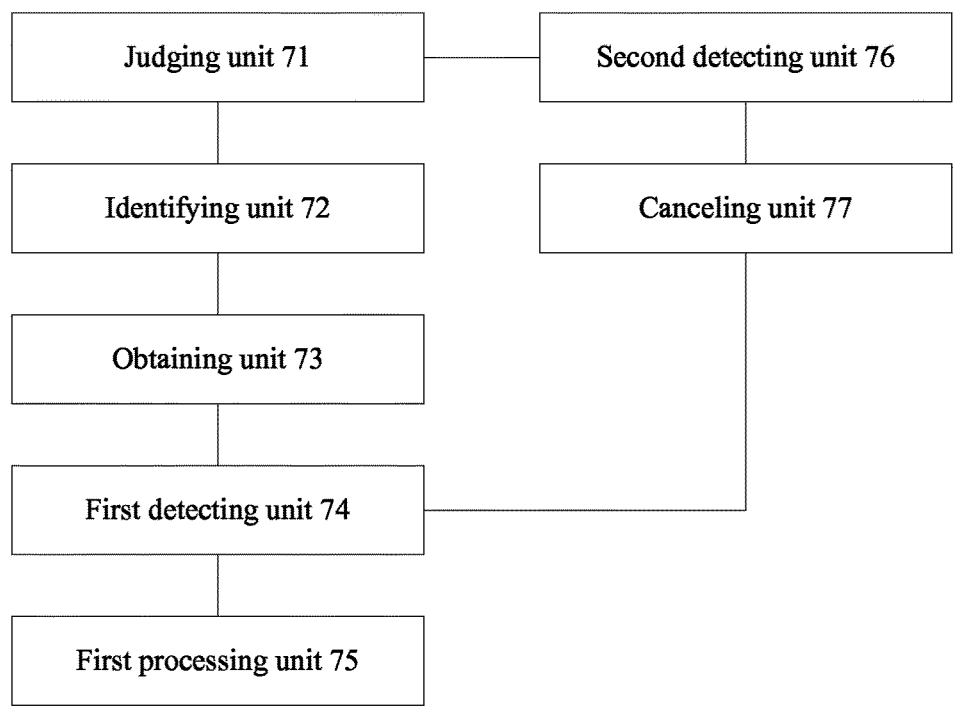
FIG. 7 is a structural composition schematic diagram of an electronic apparatus according to Embodiment Two of the present invention.

FIG. 7 is a structural composition schematic diagram of an electronic apparatus according to Embodiment Two of the present invention; the electronic apparatus in this embodiment having a display unit, and a projection unit; the display unit being capable of displaying N non-full-screen windows corresponding to N applications, where N≥1, a display region of the non-full-screen window being smaller than a display region of a full-screen window of the display unit; wherein an i-th non-full-screen window in the N non-full-screen windows is in a first state, where 1≤i≤N, and non-full-screen windows other than the i-th non-full-screen window is in a second state or a third state; and the projection unit being capable of projecting a content of a j-th application in the N applications onto a projection surface with the full-screen window, where 1≤j≤N; the electronic apparatus further comprising:

A determining unit 71, for determining, for each application in the N applications, whether a content of the application is projected onto the projection surface by the projection unit with the full-screen window, to obtain a determination result;

An identifying unit 72, for setting a corresponding ID for the j-th application, when the determination result indicates that the content of the j-th application in the N applications is displayed on the projection surface by the projection unit with the full-screen window;

An obtaining unit 73, for obtaining a first operation, the first operation being used in the display unit, to switch a non-full-screen window of a k-th application in the N applications to the third state, where 1≤k≤N;

A first detecting unit 74, for detecting whether the k-th application is provided with an ID, in response to the first operation, to obtain a first detection result; and A first processing unit 75, for setting a running state of the k-th application to a play state, when the first detection result indicates that the k-th application is provided with the ID, so that a content played by the k-th application is displayed on the projection surface by the projection unit with the full-screen window.

Preferably, the electronic apparatus further comprises:

A second detecting unit 76, for detecting whether the j-th application is provided with the ID, when the determination result indicates that the content of the j-th application in the N application is not displayed on the projection surface by the projection unit with the full-screen window, to obtain a second detection result; and A canceling unit 77, for canceling the provided ID, when the second detection result indicates that the j-th application is provided with the ID.

Those skilled in the art should appreciate that, functions implemented by respective units in the electronic apparatus according to the embodiment of the present invention may be interpreted with reference to relevant description for the foregoing light detection method; and the respective units in the electronic apparatus according to the embodiment of the present invention may be implemented by an analog circuit of the functions according to the embodiment of the present invention, and may also be implemented by running software that performs the functions according to the embodiment of the present invention on an intelligent terminal.

Figure 8:
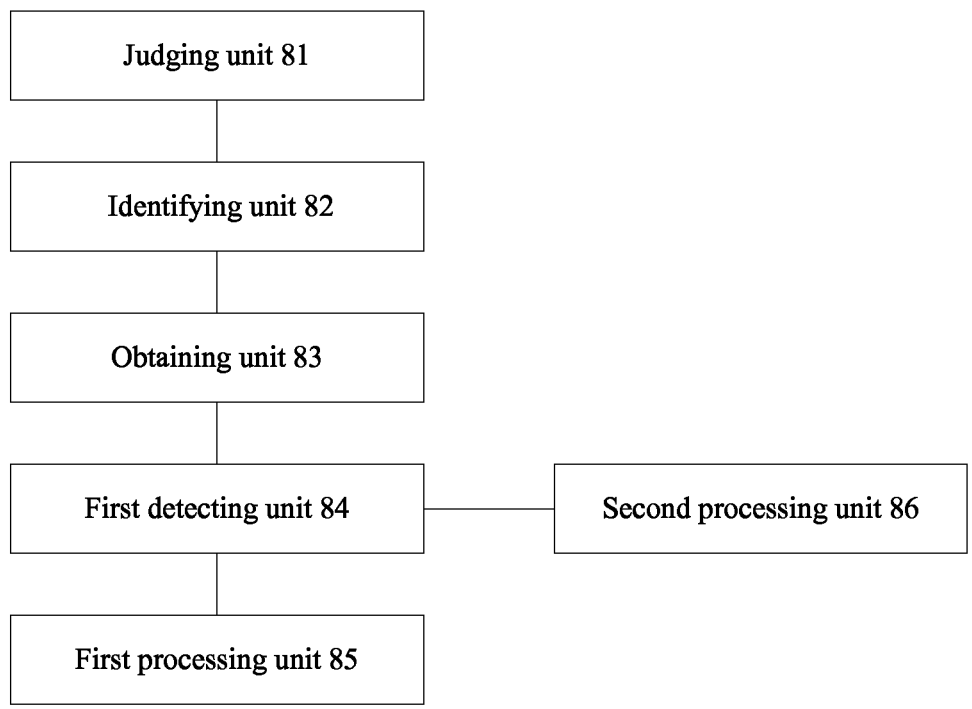
FIG. 8 is a structural composition schematic diagram of an electronic apparatus according to Embodiment Three of the present invention.

FIG. 8 is a structural composition schematic diagram of an electronic apparatus according to Embodiment Three of the present invention; the electronic apparatus in this embodiment having a display unit, and a projection unit; the display unit being capable of displaying N non-full-screen windows corresponding to N applications, where N≥1, a display region of the non-full-screen window being smaller than a display region of a full-screen window of the display unit; wherein an i-th non-full-screen window in the N non-full-screen windows is in a first state, where 1≤i≤N, and non-full-screen windows other than the i-th non-full-screen window is in a second state or a third state; and the projection unit being capable of projecting a content of a j-th application in the N applications onto a projection surface with the full-screen window, where 1≤j≤N; the electronic apparatus further comprising:

A determining unit 81, for determining, for each application in the N applications, whether a content of the application is projected onto the projection surface by the projection unit with the full-screen window, to obtain a determination result;

An identifying unit 82, for setting a corresponding ID for the j-th application, when the determination result indicates that the content of the j-th application in the N applications is displayed on the projection surface by the projection unit with the full-screen window;

An obtaining unit 83, for obtaining a first operation, the first operation being used in the display unit, to switch a non-full-screen window of a k-th application in the N applications to the third state, where 1≤k≤N;

A first detecting unit 84, for detecting whether the k-th application is provided with an ID, in response to the first operation, to obtain a first detection result; and A first processing unit 85, for setting a running state of the k-th application to a play state, when the first detection result indicates that the k-th application is provided with the ID, so that a content played by the k-th application is displayed on the projection surface by the projection unit with the full-screen window.

Preferably, the electronic apparatus further comprises:

A second processing unit 86, for setting a running state of the k-th application to an onPause state, when the first detection result indicates that the k-th application is not provided with the ID.

Preferably, each application in the N applications corresponds to a window component; and the second processing unit 86 is further used for sending an onPause message to the window component corresponding to the k-th application, so that the running state of the k-th application is the onPause state.

Preferably, the first processing unit 85 is further used for intercepting the onPause message sent to the window component corresponding to the k-th application, so that the running state of the k-th application is the play state.

Those skilled in the art should appreciate that, functions implemented by respective units in the electronic apparatus according to the embodiment of the present invention may be interpreted with reference to relevant description for the foregoing light detection method; and the respective units in the electronic apparatus according to the embodiment of the present invention may be implemented by an analog circuit of the function according to the embodiment of the present invention, and may also be implemented by running software that performs the functions according to the embodiment of the present invention on an intelligent terminal.

The technical solutions recited in the embodiments of the invention may be arbitrarily combined for use, without conflict.

In the several embodiments provided by the present invention, it should be understood that the methods and the smart devices disclosed may be implemented in other modes. The above-described apparatus embodiments are only exemplary, for example, the division of the units is only a logical functional division, and there may be other modes of division when they are actually implemented, for example, a plurality of units or components may be combined or may be integrated into another system, or some features may be omitted or not executed. In addition, coupling between the respective components shown or discussed, either direct coupling or communication connection, may be implemented by some interfaces, and indirect coupling or communicating connection between the devices or the units may be electrical, mechanical, or in other forms.

The above units described as separate components may be or may not be physically separated, and the components displayed as units may be or may not be physical units, i.e., which may be located in one place, or may be distributed in a plurality of network elements; and the purpose of this embodiment may be achieved by selecting some or all of the units therein as actually required.

Further, the respective functional units in respective embodiments of the present invention may all be integrated into a second processing unit, and the respective units may also be separately used as individual units, and two or more units may also be integrated into one unit; the above-described integrated units may be implemented in a form of hardware, or may be implemented in a form of a hardware-plus-software functional unit.

The above are only specific embodiments of the present application, but the scope of the embodiment of the invention is not limited thereto, and any skilled in the art, within the technical scope disclosed by the embodiment of the invention, can easily think of variations or replacements, which should be covered within the protection scope of the embodiment of the invention.

The invention claimed is:

1. An information processing method, wherein the method comprises:

monitoring an electronic apparatus capable of displaying N non-full-screen windows corresponding to N applications on a display unit of the electronic apparatus, where N≥1, wherein said monitoring comprises determining, whether a content of an application in the N applications is projected with the full-screen window by a projection unit of the electronic apparatus, and obtaining a determination result;

setting a corresponding identity (ID) for an application, if the determination result indicates that the content of the application is projected;

obtaining an operation, wherein the operation is used to switch a window of a k-th application among the N applications to a certain state, where the certain state is a state in which the window of the kth application is minimized and $1 \leq k \leq N$;

detecting whether the k-th application is provided with an ID, to obtain a first detection result; and setting a running state of the k-th application to a play state, if the first detection result indicates that the k-th application is provided with the ID, so that a content played by the k-th application is projected.

2. The information processing method according to claim 1, wherein the method further comprises:

detecting whether there is an application in the N applications provided with the ID if the determination result indicates that no content of an application is projected, and obtain a second detection result; and canceling the provided ID, if the second detection result indicates that there is an application in the N applications provided with the ID.

3. The information processing method according to claim 1, wherein further comprising setting a running state of the k-th application to a pause state, if the first detection result indicates that the k-th application is not provided with the ID.

4. The information processing method according to claim 3, wherein, each application in the N applications corresponds to a window component; and the setting a running state of the k-th application to a pause state, includes sending a pause message to a window component corresponding to the k-th application, so that the running state of the k-th application is the pause state.

5. The information processing method according to claim 3, wherein, each application in the N applications corresponds to a window component; and the setting a running state of the k-th application to a play state, includes intercepting a pause message sent to the window component corresponding to the k-th application, so that the running state of the k-th application is the play state.

6. An electronic apparatus, the electronic apparatus having a display unit, and a projection unit; the display unit being capable of displaying N non-full-screen windows corresponding to N applications, where $N \geq 1$, wherein the electronic apparatus further comprises:

a memory for storing a computer program; and a processor that executes the computer program to achieve the following steps:

determining whether a content of an application in the N applications is projected by the projection unit with the full-screen window, and obtain a determination result;

setting a corresponding ID for an application, if the determination result indicates that the content of the application is projected;

obtaining a first operation, wherein the operation is used to switch a window of a k-th application among the N applications to a certain state, where the certain state is a state in which the window of the kth application is minimized and $1 \leq k \leq N$;

detecting whether the k-th application is provided with an ID, to obtain a first detection result; and setting a running state of the k-th application to a play state, if the first detection result indicates that the k-th application is provided with the ID, so that a content played by the k-th application is displayed.

7. The electronic apparatus according to claim 6, wherein the processor executes the computer program to further achieve the following steps:

detecting whether there is an application in the N applications provided with the ID if the determination result indicates that no content of an application is projected, and obtain a second detection result; and canceling the provided ID, if the second detection result indicates there is an application in the N applications provided with the ID.

8. The electronic apparatus according to claim 6, wherein the processor executes the computer program to further achieve the following steps: setting a running state of the k-th application to a pause state, if the first detection result indicates that the k-th application is not provided with the ID.

9. The electronic apparatus according to claim 8, wherein each application in the N applications corresponds to a window component; and the second processing unit is further used for sending the pause message to the window component corresponding to the k-th application, so that the running state of the k-th application is the pause state.

10. The electronic apparatus according to claim 8, wherein each application in the N applications corresponds to a window component; and the first processing unit is further used for intercepting the pause message sent to the window component corresponding to the k-th application, so that the running state of the k-th application is the play state.

* * * * *